United States Patent [19]
Brown et al.

[11] Patent Number: 5,119,254
[45] Date of Patent: * Jun. 2, 1992

[54] DATA TRANSDUCER POSITION CONTROL SYSTEM FOR ROTATING DISK DATA STORAGE EQUIPMENT

[75] Inventors: David A. Brown, Saratoga, Calif.; Donald V. Daniels, Friday Harbor, Wash.; Joel N. Harrison, Monte Sereno, Calif.

[73] Assignee: Quantum Corporation, Milpitas, Calif.

[ * ] Notice: The portion of the term of this patent subsequent to Aug. 2, 2000 has been disclaimed.

[21] Appl. No.: 689,680

[22] Filed: Apr. 23, 1991

Related U.S. Application Data

[63] Continuation of Ser. No. 607,992, Oct. 31, 1990, abandoned, which is a continuation of Ser. No. 484,043, Feb. 20, 1990, Pat. No. 4,982,296, which is a continuation of Ser. No. 364,810, Jun. 9, 1989, Pat. No. 4,982,296, which is a continuation of Ser. No. 150,994, Feb. 1, 1988, Pat. No. 4,814,909, which is a continuation of Ser. No. 28,977, Mar. 23, 1987, abandoned, which is a continuation of Ser. No. 496,924, May 23, 1983, Pat. No. 4,660,106, which is a continuation of Ser. No. 190,198, Sep. 24, 1980, now Re. 32,075.

[51] Int. Cl.$^5$ .................. G11B 5/55; G11B 21/08; H02K 33/00
[52] U.S. Cl. ..................... 360/106; 310/38
[58] Field of Search .............. 360/97.01, 106, 77.08, 360/77.03; 310/38, 156, 268

[56] References Cited

U.S. PATENT DOCUMENTS

| | | | |
|---|---|---|---|
| 3,849,800 | 11/1974 | Cuzner et al. | 360/97 |
| 4,139,874 | 2/1979 | Shiraishi | 360/86 |
| 4,145,725 | 3/1979 | Wallis | 360/106 |
| 4,196,456 | 4/1980 | Manzke et al. | 360/106 |
| 4,217,612 | 8/1980 | Matla | 360/78 |
| 4,352,133 | 9/1982 | Hager | 360/106 |
| 4,396,959 | 8/1983 | Harrison et al. | 360/77 |
| 4,490,635 | 12/1984 | Harrison et al. | 310/38 |
| 4,816,938 | 3/1989 | Cowen et al. | 360/77.08 |
| 4,977,470 | 12/1990 | Murayama et al. | 360/77.08 |
| 4,982,297 | 1/1991 | Tsujisawa | 360/77.08 |

OTHER PUBLICATIONS

Robert D. commander, J. R. Taylor, "Servo Design for an Eight-Inch Disk File", IBM Disk Storage Technology, Feb. 1980, pp. 90-98.

Primary Examiner—Robert S. Tupper
Attorney, Agent, or Firm—David B. Harrison

[57] ABSTRACT

A servo calibration method is disclosed for a disk drive including a rotating data storage disk journalled to a frame and having a multiplicity of concentric data tracks defined on a major surface thereof and an actuator structure under the control of a programmed servo control microprocessor in response to coarse position information fed back to the microprocessor by a position encoder, and to fine position information fed back to the microprocessor by a data transducer reading from servo information prerecordced on the major surface of the disk, the actuator structure for moving the data transducer to each selected one of the data tracks during track seeking operations and for maintaining the transducer aligned with the data track during track following data read and/or write operations. Carried out during initialization, the method includes the steps of: automatically seeking to a region of radially outermost tracks, reading fine position information recorded in the single sector of each of a plurality of outermost tracks, and recording the outer track fine position information in memory; automatically seeking to a region of radially innermost tracks, reading fine position information recorded in the single sector of each of a plurality of innermost tracks, and recording the inner track fine position information in memory; for each data track to which a seek is initially commanded, which track lies between the outermost track region and the innermost track region, calculating with the microprocessor means a track centerline correction value lying between the outer track fine position information and the inner track fine position information, and applying the track centerline correction value so calculated as an offset value to the rotary actuator to correct any discrepancy between nominal track centerline defined by the position encoder.

14 Claims, 6 Drawing Sheets

DATA TRANSDUCER POSITION CONTROL SYSTEM FOR ROTATING DISK DATA STORAGE EQUIPMENT

RELATED APPLICATIONS AND PATENTS

The present application is a continuation of U.S. patent application Ser. No. 07/607,992, filed on Oct. 31, 1990, now abandoned, which is a continuation of U.S. patent application Ser. No. 07/484,043, filed Feb. 20, 1990 now U.S. Pat. No. 4,982,296, which is a continuation of U.S. patent application Ser. No. 07/364,810 filed on Jun. 9, 1989, now U.S. Pat. No. 4,982,296 which is a continuation of U.S. patent application Ser. No. 07/150,994, filed Feb. 1, 1988, now U.S. Pat. No. 4,814,909 which is a continuation of U S patent application, Ser. No. 07/028,977, filed on Mar. 23, 1987, now abandoned, which is a continuation of U.S. patent application Ser. No. 06/496,924, filed on May 23, 1983, now U.S. Pat. No. 4,660,106, which is a continuation of U S patent application Ser. No. 06/190,198, filed on Sep. 24, 1980, later U.S. Pat. No. 4,396,959, now U.S. Reissue Pat. No. 32,075.

BACKGROUND OF THE INVENTION

This invention relates to position control systems and methods for translating one member relative to another; and, more particularly, this invention relates to methods and apparatus for moving a memory data device member such as a data transducer relative to another member such as to a desired concentric track of a rotating disk, and keeping the moved member in desired alignment with the other member, e.g. the transducer in registration with the track.

In electromechanical devices such as the rigid rotating memory devices disclosed by the prior art, two basic approaches have been taken in order to position data transducers radially relative to the rotating magnetic disk surface. A first, high cost approach was to utilize a dedicated servo system with a servo head and a replicated servo surface on the disk to provide a high performance track-following transducer positioning scheme. On the other hand a more recent, low cost approach was to utilize completely open loop stepping motor positioners which operated to place the transducer at arbitrarily defined tracks without any actual position information being fed back from the disk to the head positioner. The main drawback of the prior art low cost open loop approach was the requirement that tracks be spaced far enough apart to take into account all of the variations of the system, including mechanical tolerances in the stepping motor actuator, thermal expansion of the disk, and disk run-out. The result was a disk drive product which, while effective as a low cost unit, lacked the data storage capacity of the more expensive units with the result that the cost of storage per bit stored of the low cost drives approached the same cost as the earlier, more expensive storage units.

SUMMARY OF THE INVENTION

One object of the present invention is to provide a novel apparatus for positioning one member such as a data transducer relative to another member, such as a rotating data storage medium.

Another object of the present invention is to provide a low cost closed loop servo control system which combines the best features of the prior art to improve the accuracy of maintaining a transducer in alignment with a data track during read and/or write operations of a disk having high data track densities.

A further object of the present invention is to provide an improved yet more reliable open loop position seeking system which overrides a closed loop position maintaining servo control when seeking from one position to another position.

Yet another object of the present invention is to provide a lightweight, substantially linear pure torque producing rotary actuator transducer carriage structure for rapidly moving the transducer radially across the range of data tracks during track seeking operations and to maintain the transducer on track during data read and write operations.

A still further object of the present invention is to provide a unique singe servo sector on the rotating disk which contains track centerline data capable of being read by the transducer and converted to an offset value to provide a fine adjustment to the head carriage in order to maintain the transducer at the centerline of the track during read and write operations.

Yet one more object of the present invention is to provide an improved, yet simplified high speed and pure torque producing position translator for positioning one member radially to another member.

One more object of the present invention is to combine readily available and inexpensive electrical and mechanical components in a unique way to provide an improved position control system which occupies a small physical space, which requires only a modest power supply, which is inexpensive to manufacture and which operates reliably over a long useful life.

These and other objects of the present invention are obtained in electromechanical equipment such as a disk drive data storage subsystem which includes a frame and a member such as a head support structure rotatably mounted to the frame and movable relative to the frame among preselected available ones of a multiplicity of selectable positions such as concentric data tracks of a rotating data storage disk.

The movable member includes a bidirectionally movable electromechanical actuator supported by the frame.

A bidirectional mover driver circuit is connected to the actuator for moving the member to maintain it at a selected one of the positions during a maintained position mode of operation and to transport the member from a departure position to a destination position during a new position seeking mode of operation.

A position transducer coupled closely to the electromechanical actuator and the frame provides a polyphase signal, such as quadrature, which is generated in response to actual sensed present position of the member relative to the frame.

A position controller circuit is connected to the position transducer, to the mover driver and to an external source of new position selection information. The controller circuit records the present position of the member relative to the frame; it calculates a new position seeking command in response to known present position and the new position selection information; and, it commands the member to move from the known present position to a requested destination position during a new position seeking mode of operation, by commanding at the actuator a first spatial increment of maximum forward direction acceleration followed by a similar spatial increment of maximum reverse direction acceleration and then by commanding adaptively a slewing rate dependent upon incremental polyphase position information of the member provided by the position transducer until the destination position is reached.

A position-dependent closed loop servo is connected to the position transducer and to the mover driver circuit for operatively controlling the driver circuit to keep the member positioned within a selected one of the positions during the maintained position modes of operation, the loop being opened during accelerative portions of new position seeking modes of operation.

Another aspect of the present invention, particularly applicable to electromechanical systems such as rotating disk storage technology provides a fine position closed loop servo. It is connected to the driver circuit and it operates fromprerecorded centerline information in a single, data masked servo sector on a data surface of the rotating disk. This data is read by a head supported by the movable member. A sample and hold circuit is connected to the head during its passes over the sector and holds the control data read therefrom. A correction signal generator, connected to the sample and hold circuit and to the driver circuit generates and supplies an offset value which, when applied to the driver circuit, promotes and maintains track centerline alignment of the head during read and/or write operations of the disk storage system. The fine position loop is overridden and ignored during accelerative portions of new position seeking modes of operation.

In one further aspect of the present invention, the correction signal generator initially calibrates the position transducer by automatically commanding the driver circuit to cause the head to move an outermost track region whereupon centerline offset information from a plurality of outermost tracks are read and recorded, and then automatically commanding the driver circuit to cause the head to move to an innermost track region whereupon centerline offset information from a plurality of innermost tracks are read and recorded. Any difference in offset values between those of the outermost tracks and those of the innermost tracks is then automatically spread over all of the data tracks, e.g. in a linear fashion, by the correction signal generator.

A rotary actuator provides another aspect of the present invention and it includes an even number of coil segments, which may be wound sequentially on a moving bobbin from single strand of wire. The coil segments are arranged adjacently in a thin disk and are connected to provide bidirectional, symmetrical torque. Potting compound encapsulates the coil structure and provides a very high resonant frequency and a capability to absorb vibration energy from the rotatable member. The rotary actuator aspect of the present invention is described in U.S. patent application Ser. No. 06/442,129, filed on Nov. 16, 1982, a divisional application of the referenced great grandparent patent application Ser. No. 06/190,198, and which now is U.S Pat. No. 4,490,635, the disclosure of which is hereby incorporated by reference.

The method of the present invention, as practiced in the environment of electromechanical equipment such as data storage systems which include moving a member such as a head support structure relative to a frame among preselected available ones of a multiplicity of selectable positions such as concentric data tracks of a rotating data storage disk, includes the steps of:

moving the member electromechanically relative to the frame in order to maintain it at a selected one of the positions during a maintained position mode of operation and in order to transport the member from a departure position to a destination position during a new position seeking mode of operation;

generating a polyphase signal, such as quadrature, in response to sensed actual present position of the member relative to the frame;

receiving and storing new position selection information from an external position control source;

recording the present position of the member relative to the frame;

calculating a new position seeking command in response to known present position and the new position selection information;

commanding the member to move from a known present position to a requested destination position during a new position seeking mode of operation by commanding a first spatial increment of maximum forward direction acceleration, then commanding a similar spatial increment of maximum reverse direction acceleration, then commanding adaptively a position crossing slewing rate dependent upon incremental polyphase information of the member provided by the step of generating the polyphase signal until the destination position is reached, and then stopping and holding the member at the destination position until the next position changing movement is commanded, and servoing upon said generated polyphase signal for operatively maintaining the member positioned within a selected one of the positions during the maintained position mode of operation, and opening up the servo loop during accelerative portions of new position seeking modes of operation.

The invention includes as other aspects thereof in a data storage disk device the further steps of:

providing a single, data masked servo sector on a data surface of the disk, prerecording track centerline servo control data in the servo sector, reading the servo data with a head passing adjacent to the disk surface containing the control sector, sampling and holding the read servo data, generating an offset correction signal from the held servo data, applying the offset signal to move the member so as to maintain and promote centerline alignment of a data transducer head carried on the member with each selected concentric data track during read and/or write operations, to provide a fine position servo control loop, and overriding the fine position servo control loop during track seeking operations.

The invention includes as still further aspects thereof a fixed disk drive for storing blocks of user data in concentric tracks defined upon a data storage surface of a data storage disk rotating relative to a base within an enclosure. The disk drive includes a spindle motor mounted to the base for rotating the disk at a substantially constant angular velocity; and, a mass balanced rotary voice coil actuator rotatably mounted to the base within the enclosure and supporting a data transducer head for flying in close proximity to the data storage surface upon an air bearing formed by relative movement between the head and the rotating disk and for positioning the head at each selected one of the multiplicity of concentric data tracks thereby providing random access to each track. The rotary actuator includes an actuator spindle including a mounting post secured to the base and a hub journalled by bearings to the mounting post. A head arm extends from the hub and supports the data transducer head. A rotary actuator motor comprises an upper flux return plate and a lower flux return plate secured with reference to the base within the enclosure, and defining a magnetic circuit gap therebetween. A permanent magnet structure defining a plurality of polar faces is secured to at least one of the upper and lower flux return plates within the gap; and, at least one flat, generally wedge shaped coil formed of plural turns of wire encapsulated in a solid body bonded to the hub is positioned to face the polar faces of the permanent magnet structure, so that driving currents passing through the coil means causes the actuator hub to rotate. The disk drive further includes a head position servo loop for generating and supplying operating currents to the wedge shaped coil in order to cause the rotary actuator to move to a desired one of the concentric data tracks during track seeking operations and to follow generally the centerline of the desired one track during track following operations when user data may be written to the track and read from the track.

Other objects, advantages and features of the invention will be apparent to those skilled in the art from a consideration of the following detailed description of a preferred embodiment, presented in conjunction with the accompanying drawings.

DESCRIPTION OF A PREFERRED EMBODIMENT

Figure 1:
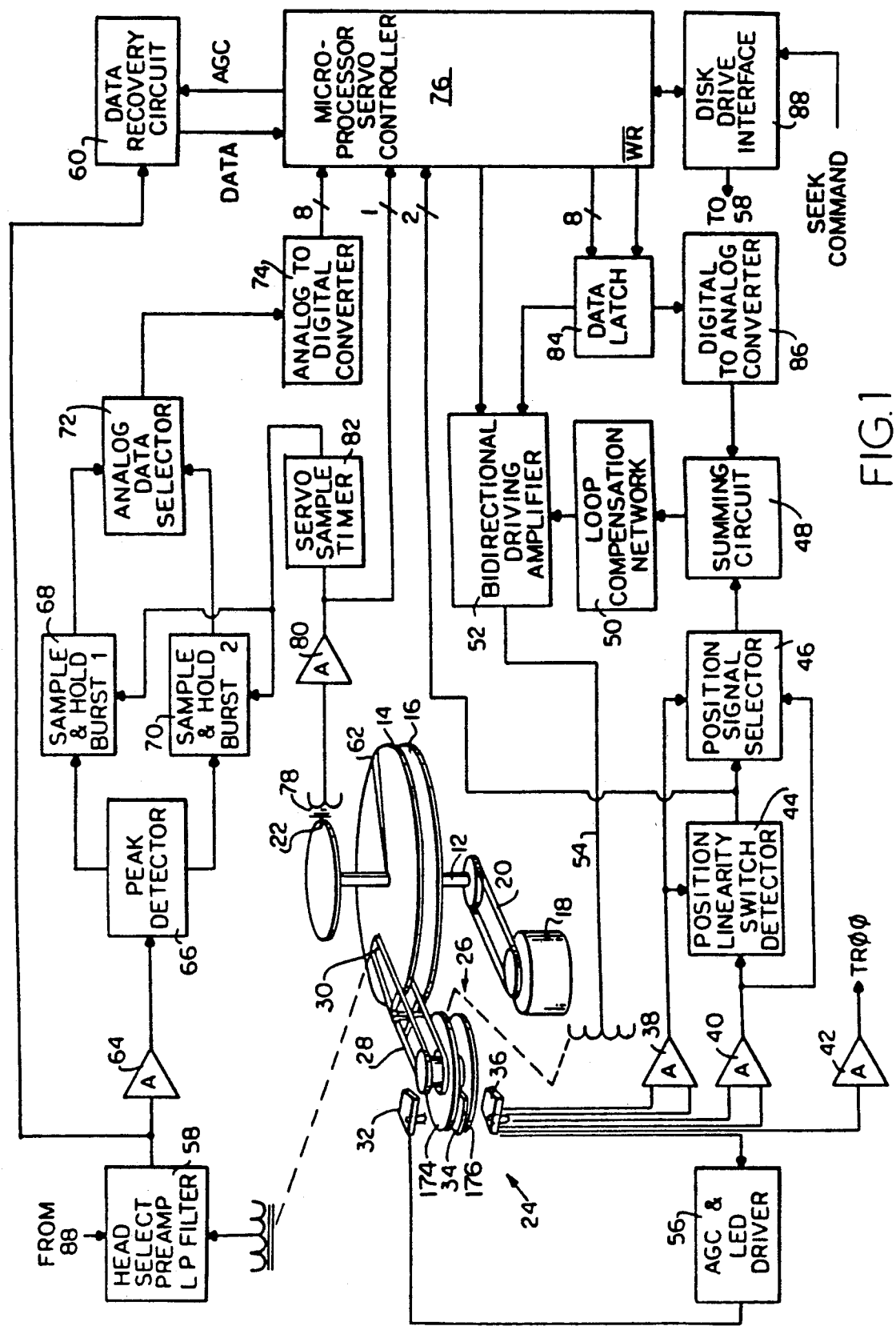
FIG. 1 is an overall system block diagram illustrating the principles of the present invention.

Referring to FIG. 1, the hard disk memory system 10 illustrated in overview therein is one in which a drive spindle 12 and one to four approximately eight inch diameter magnetic disks (two disks 14 and 16 are depicted) are caused to rotate about the common axis of the spindle at e.g. 50 Hz (3000 RPM) by a suitable disk drive motor 18 with pulleys and a drive belt 20 in conventional fashion. The system 10 may include as many as four or more magnetic disks, and other disk diameters such as fourteen or five and one quarter inches are usable, although eight inches is presently preferred. The disks 14 and 16 may be formed from thin aluminum sheet having an oriented ferric oxide or other suitable magnetic coating on the major surfaces thereof. While magnetic surface disks are described, the present invention may be effectively utilized with other kinds of data storage devices, including laser etched disks or optical storage devices. An index marker 22 provided on the spindle (FIG. 9) is used to provide a tachometer or index clock signal which is used to control servo operations in a manner to be described shortly and which also serves as a check to assure that the disks are rotating at the desired 50 Hz angular velocity.

A head carriage assembly 24 includes a pure-torque-generating rotary actuator 26 to which head support beams 28 are mounted for radial movement relative to the disks 14 and 16. The rotary actuator 26 is described in greater detailed in the incorporated and referenced prior U.S. Pat. No. 4,490,635. Read/write transducers (heads) 30 are secured to the periphery of the support beams 28, and these heads may be of the type which ride upon an air bearing effect in accordance with what has come to be known in the art as Winchester technology.

Figure 7:
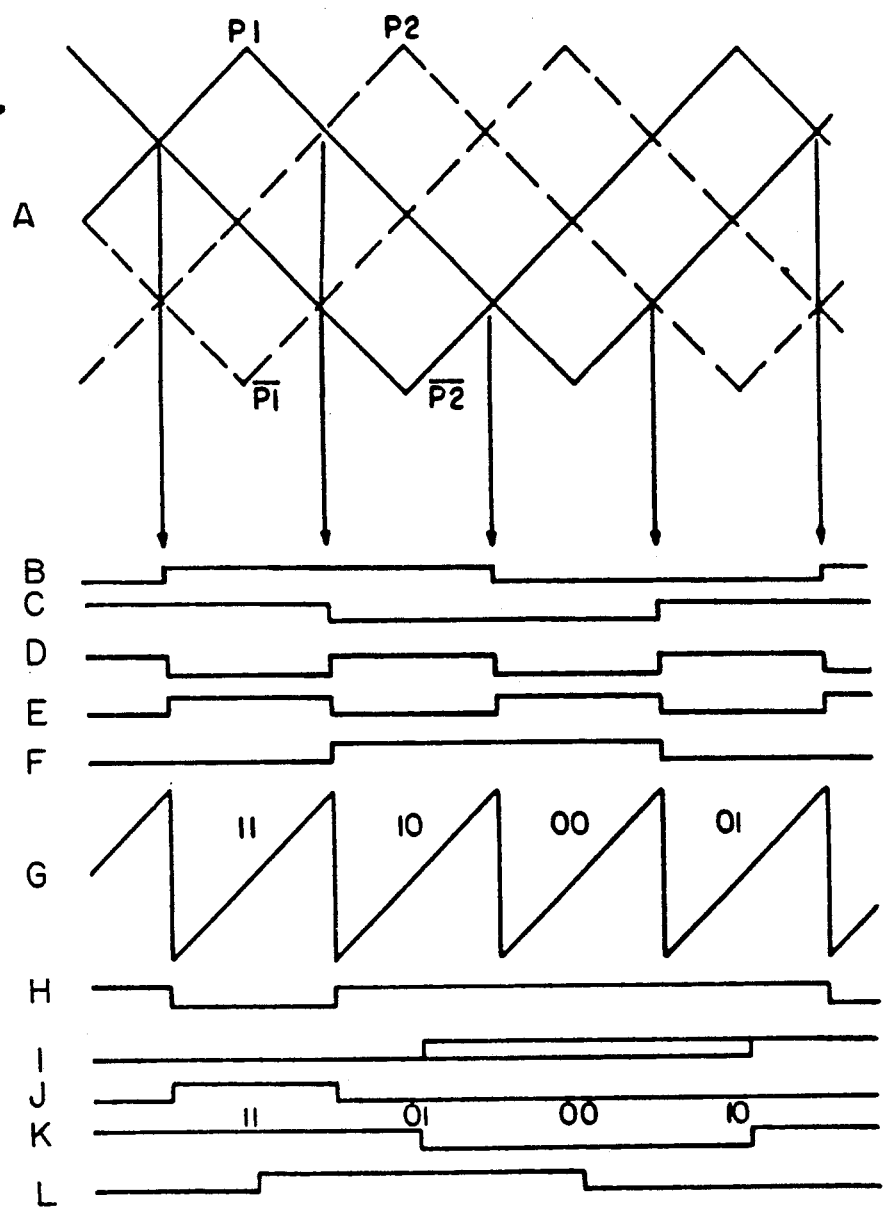
FIG. 7, consisting of graphs A-L, are waveform diagrams depicting the control signals generated by the FIG. 1 system in response to the FIG. 5 sensor.

A coarse head position electro-optical transducer 30, which is mounted to the frame 100, includes a controlled current light emitting diode light source 32, a moving scale 34 mounted to the rotary actuator 26 and having a series of equally closely spaced microscopic radial lines, and an integrated circuit photo sensitive reticle-masked diode array 36, which in combination produce the light and dark polyphase (e.g. quadrature) patterns depicted in FIG. 6 and are used to generate the sawtooth servo waveform A depicted in FIG. 7.

There are five outputs from the photo sensitive array 36. Four of the outputs are quadrature track position signals which are processed by the differential amplifiers 38 and 40. The fifth is a signal which indicates location of the heads 30 at track zero (i.e. the radially outermost usable data track) and it is amplified and shaped by an amplifier 42. The quadrature signals from the differential amplifiers 38 and 40 are supplied to a position linearity switch detector circuit 44 which provides the waveforms B and C depicted in FIG. 7, and also to a position signal selector circuit 46, the operation of which is controlled by the switch detector circuit 44.

Figure 5:
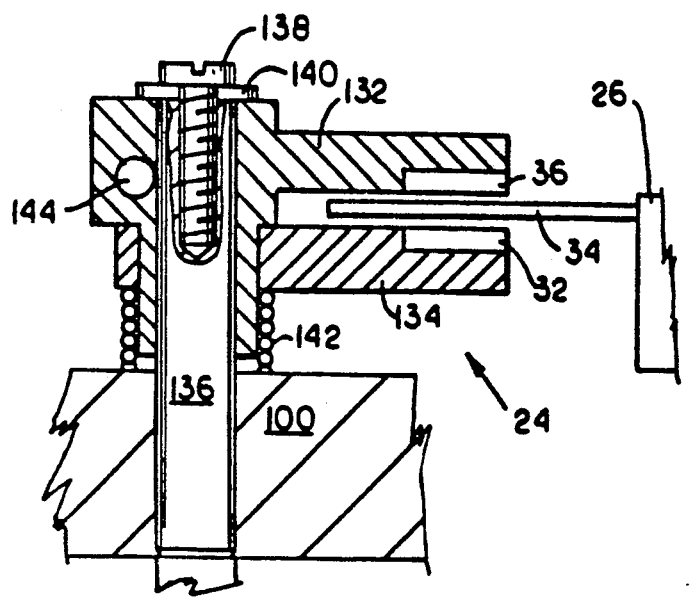
FIG. 5 is an enlarged sectional view in side elevation of the coarse head position sensor assembly of the system depicted in FIG. 1.
Figure 6A:
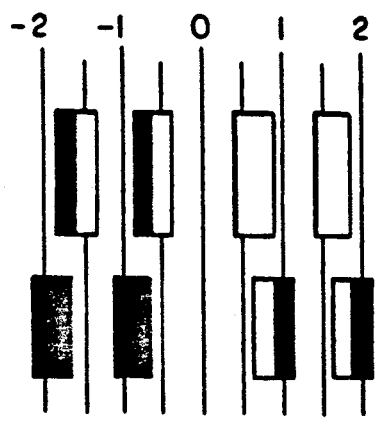
FIG. 6, consisting of graphs A-D, is a series of graphic representations of the operational states of the sensor assembly depicted in FIG. 5.
Figure 6C:
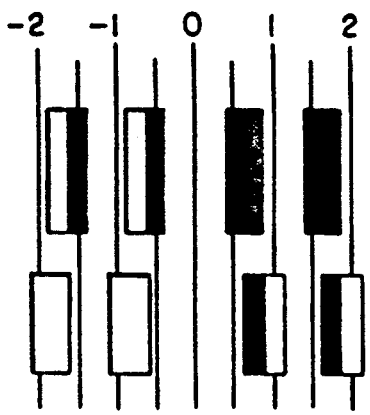
Figure 6B:
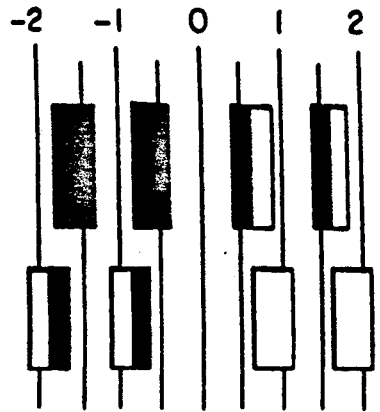
Figure 6D:

As depicted diagrammatically in FIG. 1, structurally in FIG. 5, optically in FIG. 6 and electrically in FIG. 7, the scale 34 rotates with the head structure 28 relative to the frame 100. With this rotation the scale microlines pass between and interrupt the light beams passing from the light source 32 to the detector array 36. With the geometry of the detector array being in accordance with the FIG. 6 sketches, four data tracks may be defined by each microline and space.

The geometry of the light sensitive photodiode array 36 is depicted in FIG. 6. Actually, there are four pairs of detector windows which are radially offset by a distance of a half of a microline. Each window pair sees four phases of each line: first half line, full line (full dark), last half line, and no line (full light). The window pairs are further paired together diagonally. For example, the top left window pair and the bottom right window pair provide the two differential inputs to the amplifier 38, and the bottom left and top right pairs are the inputs to the amplifier 40. In FIG. 6A equal and oppositely phased light and dark areas in the upper left and lower right detector parts provide a null output defining one track. In FIG. 6B the scale 34 has moved to the next phase so that full lines are now seen in the top left windows. In this situation the bottom left and top right are equal and opposite, and the amplifier 40 is at null point defining the next data track. In FIG. 6C the scale 34 has moved yet another half line width and the third phase pattern presented is the same as FIG. 6A, except for phase reversal. In FIG. 6D the scale 34 has moved still another half line width to the fourth phase pattern, similar to the FIG. 6B pattern, except for phase reversal.

The output of the position linearity switch detector 44 is depicted as the FIG. 7 B and C waveforms The output from the position signal selector 46 is an analog value which is supplied to a summing network 48, and then on through a loop compensation (damping) network 50, a bidirectional moving coil driver amplifier circuit 52 and ultimately to the armature coils of the rotary actuator 26 via a bidirectional rotation driving line 54. The analog value produces a correction torque to keep the heads 30 within the boundaries of each data track defined by the scale 34 and photodetector 36 The light emitting diode light source 34 is powered by a driver circuit 56 which includes an automatic light level (AGC) control developed from a sixth photodetector in the detector array 36.

The data read by one of the transducers 30 is selected, preamplified and low pass filtered by the circuits denoted by the block 58 of FIG. 1. Thereafter, the reproduced MFM formatted data is recovered by a data recovery circuit 60 and sent to the host computer or other appliance to which the system 10 is connected for random access data storage and retrieval.

Figure 2:
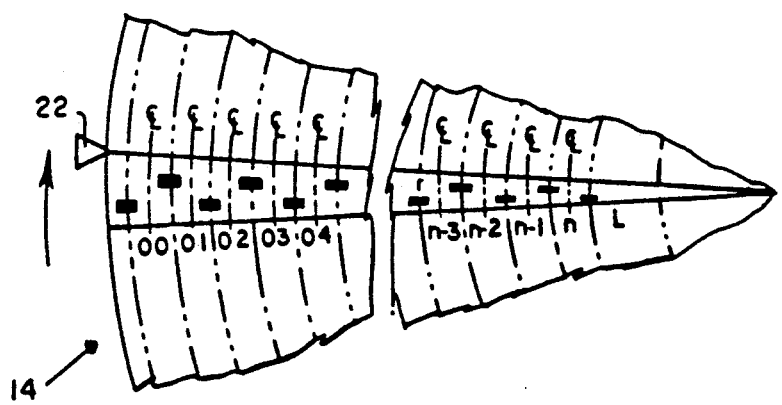
FIG. 2 is an enlarged and diagrammatic plan view of a wedge shaped portion of the rigid disk, illustrating the single servo sector pattern for inner and outer tracks, with the middle tracks broken away to save drawing space.
Figure 3:
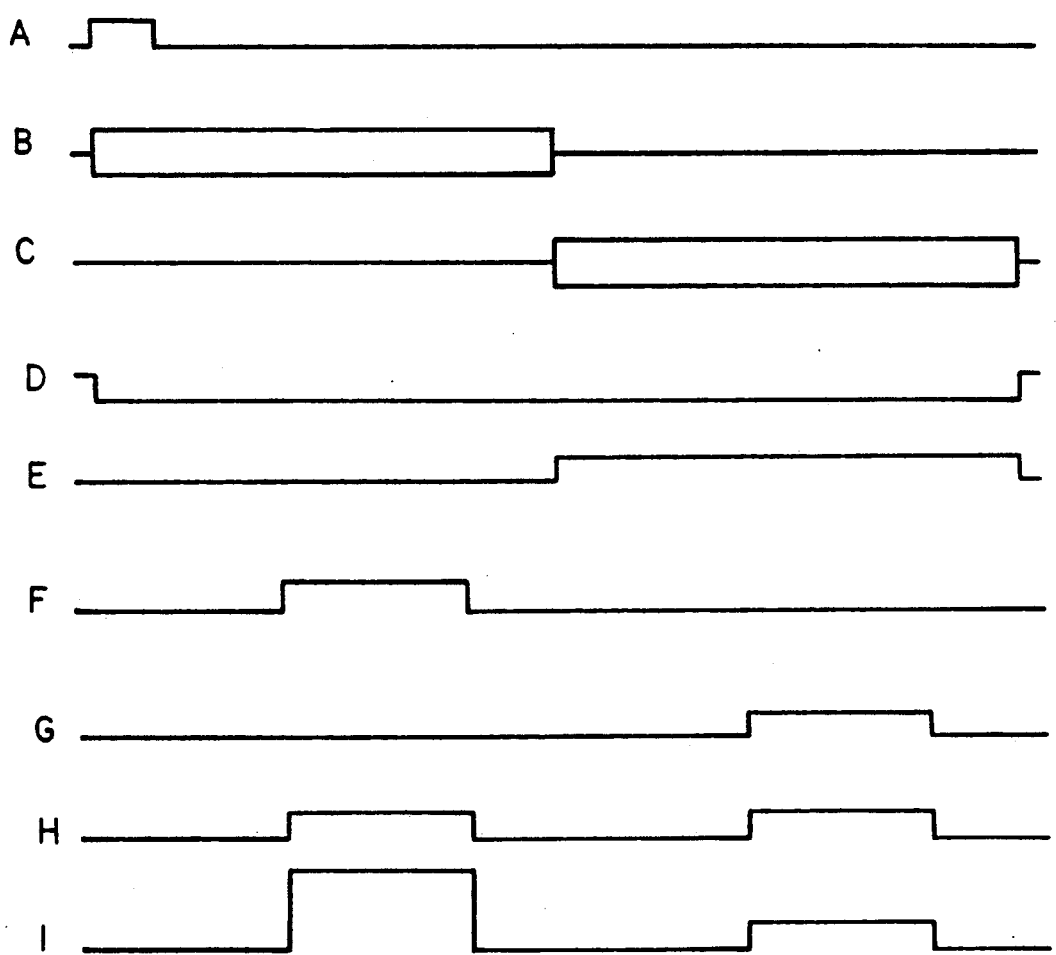
FIG. 3 consisting of graphs A-L is a series of timing and waveform diagrams related to the operation of the system in response to sensing the track servo sector information depicted in FIG. 2.

One disk surface 14 may be provided with a narrow, 200 byte wide sector 62, which is depicted diagrammatically in FIG. 2 and electrically by the FIG. 3 waveforms. Each data track, from track zero to track n (e.g. track 511) is provided with two factory prerecorded microfrequency bursts, a first occurring burst B1 on the outside half of e.g. odd tracks (and inside half of e.g. even tracks) and a second occurring burst B2 on the inside half of odd tracks (outside half of even tracks). The sector bursts are read each revolution by the head 30 and are used to provide a fine head position servo loop control signal to the rotary actuator 26 in the form of an offset voltage to urge the head 30 into alignment with the centerline of the track. Each burst is read in turn and integrated by the peak detector 66 to provide the amplitudes thereof. These amplitudes are then sampled and held by circuits 68 and 70. The held values are selected by an analog data selector 72 and converted to eight bit digital values by an analog to digital converter 74. The digital values are processed in a digital system controller microprocessor 76, such as the Intel type 8048 which contains a 1k byte factory preprogrammed read only program memory and a 128 byte random access scratchpad memory.

A detector 78 detects the index mark on the drive spindle 12 with each revolution. This index clock signal is passed through an amplifier 80 and sent to the microprocessor 76 to provide a digital tachometer to determine whether the disks are rotating at correct speed and to mark the location in time of the servo sector on the disk The index clock is also processed by a servo sample timer 82 which is used to enable and switch between the sample and hold circuits 68 and 70.

The waveforms of FIG. 3 illustrate the operation of the circuit elements 30, 58, 64, 66, 68, 70, 72, 74, 76, 78, 80 and 82 which provide the fine position servo. Waveform A depicts the 50 Hz index pulse I generated from the index marker 22 by the index detector 78. Waveforms B and C depict the first occurring Burst 1 and second occurring Burst 2. Waveform D depicts the servo sector data window which immediately follows each index pulse. Waveform E shows the control signal from the servo sample timer 82 as it is applied to the sample and hold circuits 68 and 70. It divides the sector into two 100 byte halves. Waveform F shows the amplitude of a first burst A stored in the first sample and hold circuit 68. Waveform G shows the amplitude of the second burst B stored in the second sample and hold circuit 70. Waveform H depicts equivalence of sensed amplitudes which obtains when the head is properly aligned within one data track. In this situation no offset value is required and none will be supplied by the microprocessor 76 to the rotary actuator 26. Waveform I depicts a much larger first burst than second burst which indicates that the head 30 is not on center but is close to a edge of the track.

It will be appreciated by inspection of FIG. 2 that servo bursts on innermost tracks n-3, n-2, n-1 and n are much smaller in amplitude than bursts on outermost tracks 00, 01, 02, 03 and 04. Consequently, in order to calculate a valid offset signal for fine position servo purposes, it is necessary to calculate the percentage of difference between burst amplitudes with the microprocessor 76. This calculation automatically provides an automatic gain control (AGC) signal for each track, a signal which may be applied to the data recovery circuit 60 or to other circuits for providing gain equalization for recovered data.

A disk drive interface circuit 88 receives control information from the host computer, etc., and supplies that information, including track seek data to the microprocessor 76. Data surface/head select information is sent directly to the head select circuit 58. The microprocessor 76 always knows where the head is presently located because of a two bit quadrature signal line from the switch detector 44. The microprocessor 76 determines how far and in what direction to move the head (seek) and then it calculates a set of numbers which are put out in a sequence dependent upon actual head position sensed at the optical encoder 30 during the seek operation.

Figure 4:
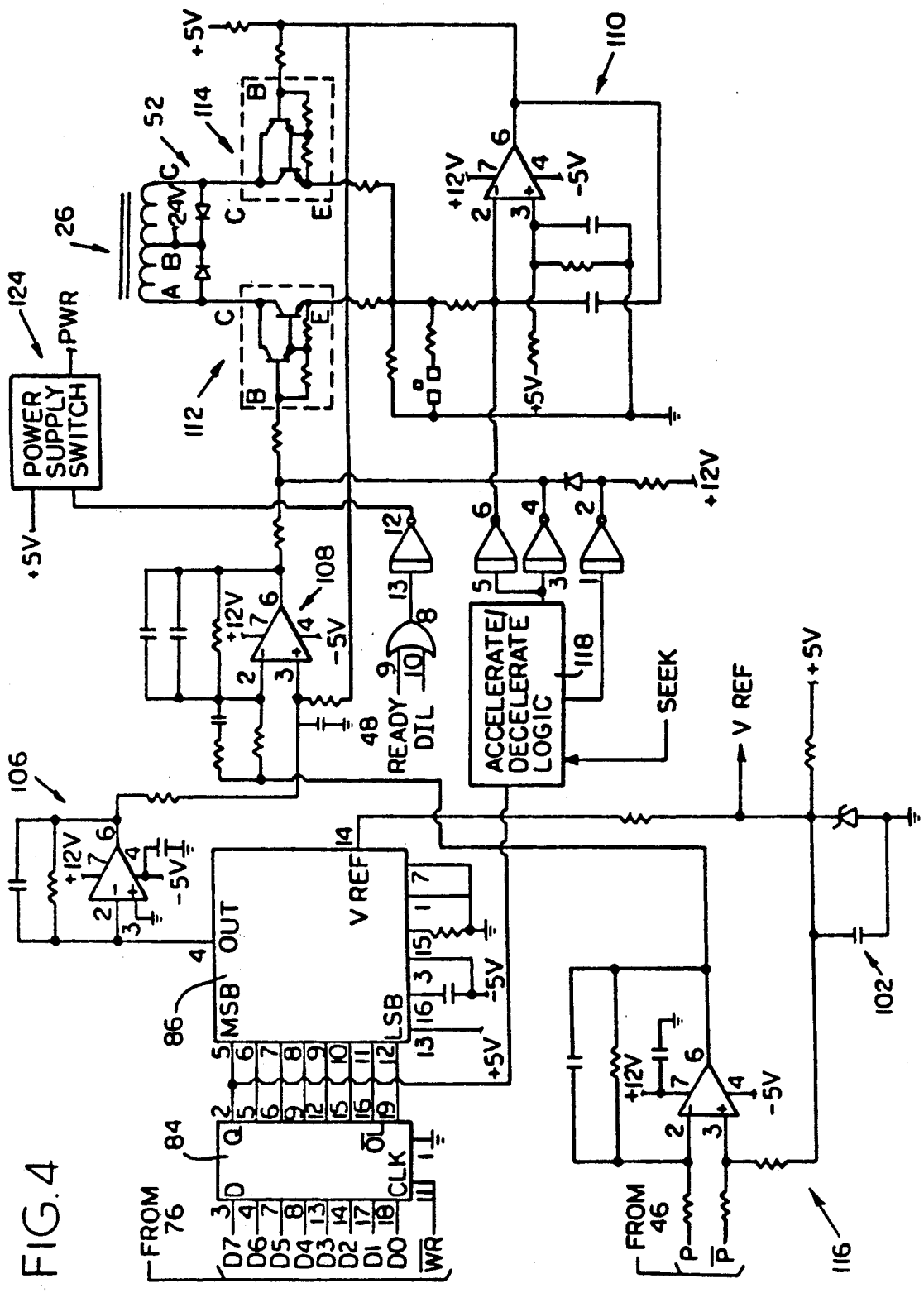
FIG. 4 is a block and schematic diagram of some of the circuitry of the system depicted in FIG. 1.

Some of the major elements of the coarse position closed loop servo and the digital override circuitry are depicted in FIG. 4. Therein, the latch 84 is depicted as a standard TTL type 74LS374 latch which is clocked by an input from the WRITE line of the microprocessor 76. The digital to analog converter (DAC) 86 is depicted as a Motorola type MC 1408L8, and it receives the latched eight bit numbers of offset values from the latch 84 and converts them to control currents. A voltage reference circuit 102 is utilized to reference the DAC to system voltages. An operational amplifier current to voltage converter 106 buffers and scales the resultant analog control voltage from the DAC 86. The summing circuit 48 in the implementation depicted in FIG. 4 occurs at the input of the driving amplifier 52 which is supplied with the analog offset voltages from the DAC 86 and the coarse servo loop voltages from the position signal selector 46.

The circuitry of the bidirectional driving amplifier 52 emulates the operation of a differential output amplifier. To do this, the circuitry includes two amplifiers 108 and 110 wired as shown in FIG. 4. The analog controls to the driving amplifier 52 occur at the input of the op amp 108, and the digital seek override controls are applied directly to the inputs of two Darlington pair power drivers 112 and 114 which drive the two windings A-B and B-C of the rotary actuator The op amp 110 functions to make the characteristics of the driver 114 opposite and complementary to the input of the driver 112.

An operational amplifier 116 receives two complementary coarse servo loop control signals P and bar P from the position signal selector 46. These values are equal and opposite and are of minimum amplitude when the head carriage 28 is in general alignment with any given defined track. The P and Bar P values are selected by the position signal selector 46 in accordance with the digital quadrature waveforms K and L depicted in FIG. 7.

An accelerate and decelerate combinatorial logic array 118 accepts a two bit word derived from the high order data bit clocked from the latch 84, and a binary control line from the microprocessor 76 designated the SEEK ENABLE line. The logic 118 provides digital outputs which are buffered and inverted and are then applied to the input of the power amplifier 112 via a line 120 and to the inverted input of the amplifier 114 via a line 122 (and the inverting op amp 110). The power amplifiers 112 and 114 may be implemented as type TIP 140 power Darlington pairs which are thermally sumped to the cast aluminum frame 100 (FIG. 9) of the system 10. The operational amplifiers 106, 108, 110 and 116 may be type 741, or equivalent.

A power supply switch 124 switches on the power supply to the amplifier 52 only when it concurrently receives three enabling signals a signal indicating presence of the required supply voltages, a READY control signal from the microprocessor 76, which denotes that the disks 14, 16 are spinning at operating velocity, and a DRIVE INHIBIT line signal. In the event of a loss of operating velocity, power supply potential or in case of a system reset, power is removed from the driver amplifier 52, and the head carriage assembly 28 automatically returns to the inner landing zone in response to a bias spring 194 (FIG. 9) which operates in default of the rotary actuator 26.

The individual circuit components depicted in FIG. 4 are connected as shown and will not be discussed further, since the values and connections are readily derived by those skilled in the art.

Referring to FIG. 1, an eight bit data word output from the microprocessor 76 is supplied to the data latch 84 which is clocked by the WRITE ENABLE line of the microprocessor 76. Each eight bit number held in the latch 84 is converted to an analog value by the digital to analog converter 86. The high order latched bit, along with another control line direct from the microprocessor 76, is applied directly to the driving amplifier 52 so as to override the coarse position servo system (elements 24, 38, 40, 44, 46, 48, 50) during the maximum accelerative and decelerative phases of a track seek operation. In the final phase of a track seek, a predetermined velocity slewing rate is achieved by recurrent number series which are converted to analog values by the converter 86 and applied to the summing circuit 48. During the initial maximum accelerative and decelerative step function portion, the coarse servo loop is completely overridden. At about eight tracks from the destination track, the maximum deceleration command is removed just before the carriage assembly 24 ceases to move. Thereafter, the coarse servo is commanded to slew across each track by a progressive analog staircase signal which is reset to zero with each detected track crossing. In this way, the coarse servo, under the command of the microprocessor 76, operates solely upon the position information derived from the transducer 24 and irrespective of actual instantaneous velocity of the head carriage assembly 24.

Figure 8:
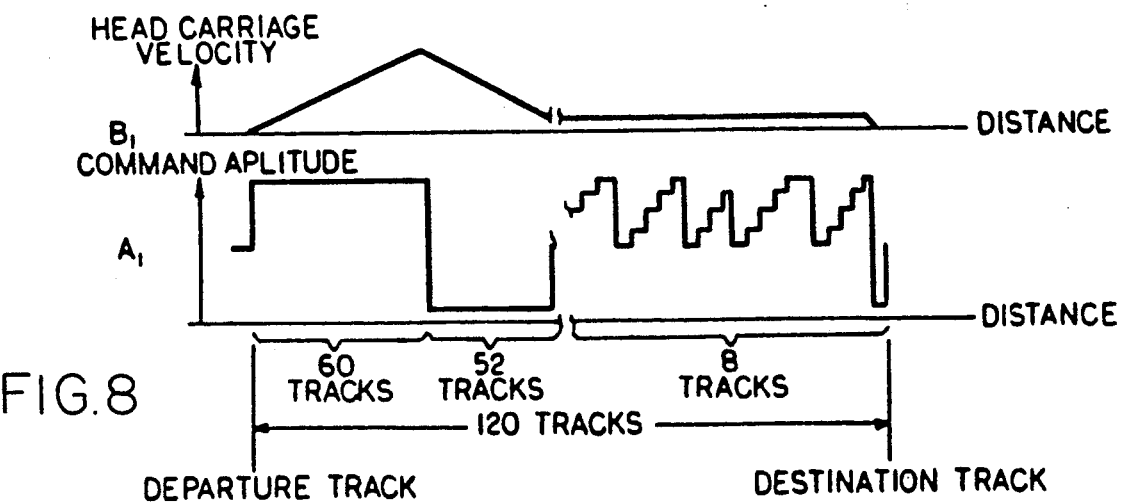
FIG. 8 is a waveform diagram depicting operation of the system of FIG. 1 during a track seeking operation of approximately 120 tracks in radial distance.

If a track crossing occurs sooner than expected, then the staircase command resets to zero before a maximum value is reached. If a track crossing is delayed, then the staircase reaches and holds its maximum value until the transition. These conditions are illustrated in FIG. 8A.

Finally, a short deceleration step function may be applied to stop the carriage assembly 24 at the destination track should its velocity not then have reached zero. FIG. 8A depicts the digital and analog waveforms utilized to command a track seek across e.g. 120 tracks. FIG. 8B portrays the velocity of the head carriage 24 relative to radial distance across the 120 tracks.

When the destination track has been reached, the system 10 enters a track extension control mode. One implementation of this mode is to select the appropriate monophase of the quadrature signal and servo over its full cycle (i.e. a distance of plus or minus two tracks) In this way the radial range of servo loop control covers a full four tracks, and only in the event that the head structure 28 is significantly jarred or otherwise is externally caused to move beyond plus or minus two tracks, will the coarse servo lose control. Upon a loss of servo control the system 10 enters a reset mode which resets the system and returns the head 30 to the last selected track.

The microprocessor 76 has essentially five modes of operation or tasks: initialization, fine servo offset supervision, track seeking, emulation of other disk drive products, and self diagnostics. In the initialization or start up mode when power is first applied, the microprocessor 76 counts index pulses and compares them with an internal clock, to be sure that the disk spindle 12 is rotating at the proper velocity (50 Hz). The head 30 is initially located in a nonabrasive landing zone L (FIG. 2). The microprocessor 76 initially commands a seek to the outermost track (track 00). When the head 30 reaches the outermost track, a special output is obtained from the transducer 24 through the amplifier 42 (FIG. 7-J). The microprocessor 76 then calibrates the fine servo by measuring, establishing and remembering offsets for the four outermost tracks 00, 01, 02, and 03, and then for the four innermost tracks n-3, n-2, n-1 and n. If there is any difference in initial calibration between the outermost and innermost tracks, the microprocessor 76 spreads this difference e.g. linearly over the total number of tracks of the system. The microprocessor 76 then commands the head 30 back to track 00. Initialization is then complete.

During read and write operations, the microprocessor 76 reads the fine servo continuously and updates the offset, to take into account position errors such as thermal expansion of the disks 14, 16 as internal ambient temperatures rise.

As already explained, the microprocessor 76 receives seek commands digitally from the host computer via the disk drive interface 88. The microprocessor 76 maintains head position data in a register which counts the tracks from information derived from the coarse position transducer 24. The difference between the track at which the head is presently located and the track sought, together with the sign value of the difference, which indicates the direction of head movement required to accomplish the seek, is used to calculate the series of commands from the microprocessor 76 to the rotary actuator 26.

The emulation function of the microprocessor 76 enables the system 10 to emulate the characteristics of other disk drives. One such emulation would be of the SA 1000 eight inch disk drive manufactured by Shugart Associates, a Xerox Corporation subsidiary located in Sunnyvale, Calif. The SA 1000 product utilizes two adjacent read/write heads, and the microprocessor 7 enables the system 10 to appear to a user as if two heads are actually physically present in the system. This emulation is readily provided by redefining the track counting structure in the microprocessor 76 into two series of interleaved odd and even tracks, and then reading odd tracks as though it were with one of the heads, and reading even tracks as though it were with the other of the heads. Other competitive disk drive equipment may be emulated by special programming of the microprocessor 76.

The self diagnosis function of the microprocessor 76 has short term and long term aspects. During operation, the microprocessor 76 constantly monitors disk rotating speed and head position. In the event of a discrepancy in either parameter, the microprocessor 76 takes the disk out of service and informs the host machinery of the detection of an error. Other errors and error messages are easily included, including those particularly adapted to a data format or end use. Diagnostic routines may be contained in the read only memory of the microprocessor 76 or they may be recorded on one or more of the tracks of the disk 14, and called by the microprocessor 76 as required.

Referring now to FIG. 5, the coarse head position servo transducer 24 is depicted in enlarged structural side elevation and vertical cross section. The transducer 24 is a U-shaped assembly comprising an upper member 132 which supports the photodetector and reticle array 36, and a lower member 134 which is keyed to hold the LED light source 32 in vertical alignment with the photodetector 36. The scale 34 is a glass member having equally spaced apart chrome microlines deposited thereon. It is precisely and securely attached to the head support structure 28 e.g. at the rotary actuator 26 The transducer 24 is mounted on a post 136 embedded in the cast aluminum frame 100 which securely supports all of the disk drive machinery.

A feature of the present invention is that the transducer 24 is adjustable in two dimensions with but one point of attachment to the frame 100 A vertical height setting screw 138 and lock washer 140 enables the members 132 and 134 to be adjusted up and down, so that the photodetector can be adjusted to within five thousandths of an inch of the scale 34 to achieve the required resolution. A spring 142 biases the members 132 and 134 away from the frame 100.

Sideways alignment of the transducer 24 with respect to the scale 34 is achieved by rotating the members 132 and 134 about the axis of the post 136. A locking screw mechanism 144 locks the members 132 and 134 to the post 136 at the desired sideways alignment.

Figure 9:
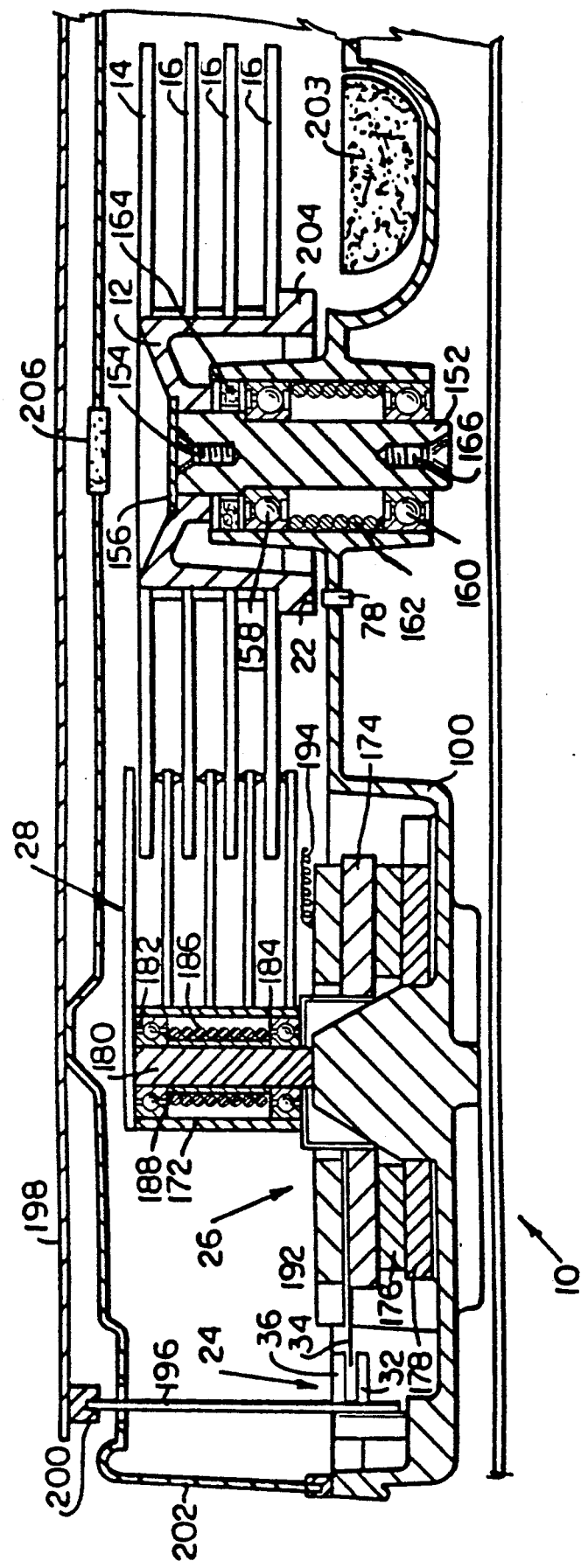
FIG. 9 is a somewhat diagrammatic view in side elevation and vertical section of a disk drive and head carriage assembly in accordance with principles of the present invention.

The structural configuration of the system 10 is depicted in FIG. 9. Therein, the drive hub 12 supports four disks, a top servo sector containing disk 14 and three lower disks 16. The index detector 22 is provided in a lower outer flange of the spindle 12, and the sensor 78 is secured through the frame 100. The spindle 12 is mounted to a spindle shaft 152 by a screw 154 and a washer 156. Ball bearing assemblies 158, 160 are placed in a cylindrical portion of the frame 100 and are held in a spaced apart configuration by a spring 162. A magnetic fluid seal 164 is placed above the bearing 158 and seals the bearings by magnetic cohesion of the sealing fluid. A bottom screw 166 secures a pulley, not illustrated, to the shaft for the drive belt 20 from the motor 18.

The rotary actuator 26 is depicted in FIG. 9. In the FIG. 9 vertical cross section, the rotary actuator 26 includes a hub 172 to which the head structure assembly 28 is mounted. A flat coil assembly 174 is secured by a holding means such as adhesive to the base of the hub 172. Immediately below the coil assembly 174 is a ferroceramic permanent magnet 176 which is fabricated as a unitary structure and then magnetized into a series of adjacent even-number opposed field magnetic segments in which the north and south poles alternate at the top and bottom of the magnet 176. The number of separate segments in the magnet 176 corresponds to the number of coil windings in the coil assembly 174. There are e.g. six coil windings, as there are, e.g. six magnetic segments in the magnet 176. An annular flux return plate 178 of low carbon steel forms a base for the magnet 176. In fabrication, a ceramic blank is glued to the base plate 178 and then the resultant structure is permanently magnetized. A fixed shaft 180 extends from a ribbed portion of the frame 100. The hub 172 is journalled to the shaft by ball bearing assemblies 182 and 184 which are initially held in place during fabrication by an axial preload spring 186, and spacer 188, with adhesive locking the bearings 182, 184 to the hub 172.

A flux return top plate 192 is secured to the frame 100. A bias spring 194 extends from a standoff on the top plate 192 to the head carriage assembly 28 and biases it to return to the inner landing zone of the disks when power is removed from the rotary actuator 26. Crash stops may be formed in the top plate 192 to limit range of head structure travel.

Other elements depicted in FIG. 9 include a printed circuit board 196 which carries the circuitry immediately associated with the optical transducer 24 including the elements 38, 40, 42 and 56 depicted in FIG. 1 and also the wiring connection of the heads 30. A main printed circuit board 198 carrying the rest of the circuitry of FIG. 1 is plugged into the board 196 at a plug 200. A plastic case 202 mates with the base 100 and provides an airtight seal throughout which is required for the reliable operation of flying head Winchester drive technology. An air filter 203 fits into a recess of the frame and fins 204 extending from the flange at the base of the spindle 12 force air within the plastic enclosure 202 to pass through the filter 203. A breather filter 206 enables internal and external pressures to equalize.

Counterweights, not shown, are added to the hub 172 to place the center of mass of the head structure 28 in alignment with the axis of rotation of the rotary actuator 26. In this way, no unbalanced forces pass through the rotor bearings 182 and 184 as the actuator rotates about its axis.

It will be apparent to those skilled in the art that the present invention may be embodied physically in a wide variety of ways and with many different elements and components. For example, the optical transducer 24 may be implemented magnetically. Alternatively, transducer information may be provided in the servo sector 62 and read with each rotation of the disk 14. The rotary actuator 26 may be replaced with an electrical detent, microstep providing stepping motor, and the combination of such a stepping motor with the time sampled fine servo loop will vastly improve track centerline following performance in a disk drive. The servo loop systems of the present invention are advantageously, but not necessarily embodied in rotating magnetic disk storage devices.

Having thus described an embodiment of the invention, it will now be appreciated that the objects of the invention have been fully achieved, and it will be understood by those skilled in the art that many changes in construction and widely differing embodiments and applications of the invention will suggest themselves without departure from the spirit and scope of the invention. The disclosures and the description herein are purely illustrative and are not intended to be in any sense limiting.

We claim:

1. A random access fixed disk drive for storing blocks of user data in concentric tracks defined upon a data storage surface of a data storage disk rotating relative to a base within an enclosure, the disk drive including spindle motor means mounted to the base for rotating the disk at a substantially constant angular velocity, a mass balanced rotary actuator means rotatably mounted to the base within the enclosure and supporting a data transducer head for flying in close proximity to the data storage surface upon an air bearing formed by relative movement between the head and the rotating disk and for positioning the head at each selected one of the multiplicity of concentric data tracks thereby providing random access to each track, and further comprising:

the rotary actuator means including rotary actuator motor means comprising:
upper flux return plate means and lower flux return plate means secured with reference to the base within the enclosure and a gap defined between the upper and lower flux return plate means,
the gap including flat, permanent magnet means defining a plurality of polar faces secured to at least one of said upper and lower flux return plate means, and at lest one flat, generally wedge shaped coil means formed of plural turns of wire encapsulated in a solid body rigidly secured to a rotary part of said rotary actuator means and facing the polar faces of said permanent magnet means that driving currents passing through the coil means causes the actuator means to rotate,
head position servo loop means for operating the rotary actuator motor means and including:
actual head position signal generating means for generating head position signals including servo signals read periodically by the data transducer head from servo information interspersed with data information on the data surface,
desired head position signal generating means for generating a desired head position in relation to a desired data storage location among the data storage tracks,
programming digital microcontroller means responsive to the actual head position signal generating means and to the desired head position signal generating means for generating and supplying head positioning control signals to the actuator motor driver means to cause the actuator means to seek to a desired track location during track seeking operations, and to follow substantially a centerline of the desired track during subsequent track following operations, and
actuator motor driver means for generating and applying said driving currents to the flat coil means.

2. The random access fixed disk drive set forth in claim 1 wherein the solid body comprises a plurality of generally wedge shaped coil means.

3. The random access fixed disk drive set forth in claim 2 wherein the solid body is formed as a flat, cylindrical shape and comprising an even number of said generally wedge shaped coil means, one half of said even number being connected in series for rotating the actuator means in one direction relative to said driving current, and another half of said even number being connected in series for rotating the actuator means in an opposite direction relative to said driving current, and further wherein the permanent magnet means comprises the same even number of polar faces oppositely facing said even number of said generally wedge shaped coil means.

4. The random access fixed disk drive set forth in claim 1 wherein a cross section of the generally wedged shaped coil means comprises a matrix of wires arranged in two dimensions.

5. The random access fixed disk drive set forth in claim 4 wherein the generally wedge shaped coil means comprises a coil of approximately 29 gauge copper wire forming the matrix as approximately nine turns across by twenty-two turns high wound upon a generally triangular forming bobbin means.

6. The random access fixed disk drive set forth in claim 1 wherein said solid body is formed as a molding of molding material formed around said flat, generally wedged shaped coil means.

7. The random access fixed disk drive set forth in claim 1 wherein said actual head position signal generating means further includes a polyphase-providing optical encoder means including a scale means coupled to a rotating part of said mass balanced rotary actuator means for generating and putting out phase signals relating to relative locations of said concentric data tracks, and wherein said microcontroller means is programmed for counting electrical signals related to cycles of said phase as track crossings.

8. The random access fixed disk drive set forth in claim 7 wherein said servo information interspersed with data information on the data surface comprises information contained in a single servo sector located within each said concentric data track and read by said actual head during sampling passes over said sector, and wherein said actual head position signal generating means further includes sample and hold means for holding electrical samples obtained during said sampling passes.

9. A fixed disk drive for storing blocks of user data in concentric tracks defined upon a data storage of a data storage disk rotating relative to a base within an enclosure, the disk drive including spindle motor means mounted to the base for rotating the disk at a substantially constant angular velocity, a mass balanced rotary voice coil actuator means rotatably mounted to the base within the enclosure and supporting a data transducer head for flying in close proximity to the data storage surface upon an air bearing formed by relative movement between the head and the rotating disk and for positioning the head at each selected one of the multiplicity of concentric data tracks thereby providing random access to each track, and further comprising:

the rotary actuator means including:
actuator spindle means including a mounting post secured to the base and hub means journalled by bearings to the mounting post,
head arm means extending from the hub means and rotary actuator motor means comprising:
upper flux return plate means and lower flux return plate means secured with reference to the base within the enclosure, and a gap defined between the upper and lower flux return plate means,
permanent magnet means defining a plurality of polar faces secured to at least one of said upper and lower flux return plate means within said gap, and
at least one flat, generally wedge shaped coil means formed of plural turns of wire encapsulated in a solid body bonded to said hub means and positioned to face the polar faces of said permanent magnet means so that driving current passing through the coil means causes the hub means to rotate, the disk drive further including head position servo loop means for generating and supplying operating currents to the wedge shaped coil means in order to cause the rotary actuator means to move to a desired one of said concentric data tracks during track seeking operations and to follow generally the centerline of said desired one track during track following operations when user data may be written to the track and read from the track.

10. The random access fixed disk drive set forth in claim 9 wherein the solid body comprises a plurality of generally wedge shaped coil means.

11. The random access fixed disk drive set forth in claim 10 wherein the solid body is formed as a flat, cylindrical shape and comprising an even number of said generally wedge shaped coil means, one half of said even number being connected in series for rotating the actuator means in one direction relative to said driving current, and another half of said even number being connected in series for rotating the actuator means in an opposite direction relative to said driving current, and further wherein the permanent magnet means comprises the same even number of polar faces oppositely facing said even number of said generally wedge shaped coil means.

12. The random access fixed disk drive set forth in claim 9 wherein a cross section of the generally wedged shaped coil means comprises a matrix of wires arranged in two dimensions.

13. The random access fixed disk drive set forth in claim 12 wherein the generally wedge shaped coil means comprises a coil of approximately 29 gauge copper wire forming the matrix as approximately nine turns across by twenty-two turns high would upon a generally triangular forming bobbin means.

14. The random access fixed disk drive set forth in claim 9 wherein said solid body is formed as a molding of molding material formed around said flat, generally wedged shaped coil means.

* * * * *